US012293063B2

(12) United States Patent
Luo

(10) Patent No.: US 12,293,063 B2
(45) Date of Patent: May 6, 2025

(54) DISPLAY ORIENTATION LOCKING METHOD, ELECTRONIC DEVICE, AND MEDIUM

(71) Applicant: Beijing Zitiao Network Technology Co., Ltd., Beijing (CN)

(72) Inventor: Song Luo, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/745,566

(22) Filed: Jun. 17, 2024

(65) Prior Publication Data
US 2024/0338111 A1 Oct. 10, 2024

Related U.S. Application Data

(63) Continuation of application No. PCT/CN2023/070747, filed on Jan. 5, 2023.

(30) Foreign Application Priority Data

Jan. 14, 2022 (CN) .......................... 202210043681.4

(51) Int. Cl.
*G06F 3/0484* (2022.01)

(52) U.S. Cl.
CPC .... *G06F 3/0484* (2013.01); *G06F 2200/1614* (2013.01); *G06F 2200/1637* (2013.01); *G09G 2340/0492* (2013.01)

(58) Field of Classification Search
CPC ..... G06F 2200/1614; G06F 2200/1637; G06F 3/0346; G06F 3/0484; H04M 2250/12; H04M 1/72403; G09G 2340/0492
See application file for complete search history.

(56) References Cited

U.S. PATENT DOCUMENTS 8,717,285 B1* 5/2014 White ................... G06F 3/0346
345/156
2003/0085870 A1* 5/2003 Hinckley ................ G06F 1/169
345/156
(Continued)

FOREIGN PATENT DOCUMENTS

CN    103631473 A    3/2014
CN    103677571 A    3/2014
(Continued)

OTHER PUBLICATIONS

Round faced chubby guy 007, "How to lock and quickly take screenshots when playing Tencent Video?," jingyan.baidu.com, Available Online at https://jingyan.baidu.com/article/8ebacdf05650e249f65cd5c4.html, Mar. 5, 2019, 12 pages.
(Continued)

*Primary Examiner* — Nicholas Ulrich
(74) *Attorney, Agent, or Firm* — Alleman Hall & Tuttle LLP

(57) ABSTRACT

A locking method and apparatus, an electronic device and a medium are provided. The locking method, applied to an application program on an electronic device, in which the method includes: displaying, in response to the electronic device meeting a set condition, a setting control in a current display interface of the application program, in which the setting control is configured to control a locking status of a display orientation of media data played by the application program; changing, in response to the setting control being triggered, the locking status of the display orientation, in which the current display interface includes the media data and an attribute control of the media data, the setting control includes a lock control and an unlock control, the lock control is configured to lock the display orientation, and the
(Continued)

Displaying, in response to the electronic device meeting a set condition, a setting control in a current display interface of the application program, wherein the setting control is configured to control a locking status of a display orientation of media data played by the application program ~ S110

Changing, in response to the setting control being triggered, the locking status of the display orientation ~ S120 unlock control is configured to unlock the display orientation.

14 Claims, 6 Drawing Sheets

(56) References Cited

U.S. PATENT DOCUMENTS

| | | | |
|---|---|---|---|
| 2013/0069989 | A1 | 3/2013 | Nagata et al. |
| 2013/0162684 | A1* | 6/2013 | Williams ............... G09G 5/363 |
| | | | 345/650 |
| 2014/0009499 | A1* | 1/2014 | Gardenfors ........... G06F 1/1643 |
| | | | 345/656 |
| 2015/0378462 | A1* | 12/2015 | Chakirov ............ G06F 3/04883 |
| | | | 715/720 |
| 2017/0076699 | A1* | 3/2017 | Tichauer ............... G06F 1/1694 |
| 2019/0064937 | A1* | 2/2019 | Ananda ................. G06F 3/0346 |
| 2022/0385984 | A1 | 12/2022 | Yuan et al. |
| 2023/0136808 | A1 | 5/2023 | Yuan et al. |
| 2024/0086056 | A1 | 3/2024 | Guo et al. |

FOREIGN PATENT DOCUMENTS

| | | |
|---|---|---|
| CN | 106020649 A | 10/2016 |
| CN | 106406848 A | 2/2017 |
| CN | 107340948 B | 5/2019 |
| CN | 111273810 A | 6/2020 |
| CN | 111294637 A | 6/2020 |
| CN | 113110783 A | 7/2021 |
| CN | 113301441 A | 8/2021 |
| CN | 114398134 A | 4/2022 |
| JP | 2012093897 A | 5/2012 |
| JP | 2019028944 A | 2/2019 |

OTHER PUBLICATIONS

China National Intellectual Property Administration, Office Action and Search Report issued in Chinese Application No. 202210043681.4, Jun. 2, 2023, 15 pages.

ISA China National Intellectual Property Administration, International Search Report Issued in Application No. PCT/CN2023/070747, May 12, 2023, 10 pages.

European Patent Office, Extended European Search Report Issued in Application No. 23739888.8, Feb. 13, 2025, Germany, 11 pages.

* cited by examiner

DISPLAY ORIENTATION LOCKING METHOD, ELECTRONIC DEVICE, AND MEDIUM

CROSS-REFERENCE TO RELATED APPLICATIONS

The present application is a continuation of International Patent Application No. PCT/CN2023/070747, filed on Jan. 5, 2023, which claims the priority to Chinese patent application No. 202210043681.4, filed on Jan. 14, 2022, and the entire content disclosed by the Chinese patent application is incorporated herein by reference as part of the present application.

TECHNICAL FIELD

Embodiments of the present disclosure relate to the technical field of electronic devices, for example, to a locking method and apparatus, an electronic device, and a medium.

BACKGROUND

An application program refers to a computer program for accomplishing one or more specific tasks. It runs in user mode, can interact with users, and has a visual user interface.

When a user browses media data through an application program, the user often seeks the most comfortable posture, such as lying down to browse media data. However, if the electronic device is in the landscape/portrait-state automatic rotation mode, the display orientation of the electronic device keeps rotating, which is very disturbing to the user. If the electronic device is in the landscape/portrait-state locked mode, it is difficult for the user to find the rotation lock built in the system in response to the user browsing media data.

Therefore, how to enable the user to conveniently control the display orientation of the electronic device in the process of using the application program is an urgent technical problem to be solved.

SUMMARY

The embodiments of the present disclosure provide a locking method, applied to an application program on an electronic device, wherein the method comprises:
  displaying, in response to the electronic device meeting a set condition, a setting control in a current display interface of the application program, wherein the setting control is configured to control a locking status of a display orientation of media data played by the application program;
  changing, in response to the setting control being triggered, the locking status of the display orientation, wherein the current display interface comprises the media data and an attribute control of the media data, the setting control comprises a lock control and an unlock control, the lock control is configured to lock the display orientation, and the unlock control is configured to unlock the display orientation.

The embodiments of the present disclosure further provide a locking apparatus, configured in an electronic device, wherein the apparatus comprises:
  a setting control display module, configured to display, in response to the electronic device meeting a set condition, a setting control in a current display interface of an application program on the electronic device, wherein the setting control is configured to control a locking status of a display orientation of media data played by the application program;
  a locking status changing module, configured to change, in response to the setting control being triggered, the locking status of the display orientation, wherein the current display interface comprises the media data and an attribute control of the media data, the setting control comprises a lock control and an unlock control, the lock control is configured to lock the display orientation, and the unlock control is configured to unlock the display orientation.

The embodiments of the present disclosure further provide an electronic device, comprising:
  a processing apparatus;
  a storage apparatus, configured to store a program;
  the program, upon being executed by the processing apparatus, causes the processing apparatus to realize the locking method provided by the embodiment of the present disclosure.

The embodiments of the present disclosure further provide a computer-readable medium, storing a computer program thereon, in which the computer program, upon being executed by a processing apparatus, realizes the locking method provided by the embodiment of the present disclosure.

DETAILED DESCRIPTION

The embodiments of the present disclosure are described hereinafter with reference to the accompanying drawings. Although some embodiments of the present disclosure are shown in the accompanying drawings, it is to be understood that the present disclosure may be implemented in various forms, and these embodiments are provided so that the present disclosure will be thoroughly and completely understood. It is to be understood that accompanying drawings and embodiments of the present disclosure are merely illustrative.

It is to be understood that the various steps described in the method embodiments of the present disclosure may be performed in a different order, and/or in parallel. Additionally, the method embodiments may include additional steps and/or omit performing the steps shown.

The term "includes" or its variant used herein means "nonexclusively includes", that is "includes, but is not limited to". The term "based on" used herein means "at least partially based on". The term "an embodiment" used herein means "at least one embodiment". The term "another embodiment" used herein means "at least another embodiment". The term "some embodiments" used herein means "at least some embodiments". Related definitions of other terms are given in the description hereinafter.

It is to be noted that concepts such as "first" and "second", etc., used herein are only intended to distinguish different apparatuses, modules or units.

It is to be noted that "one" or "a plurality" mentioned in the present disclosure is illustrative, and those skilled in the art should understand that "one" or "a plurality" is interpreted as "one or more" unless otherwise specified in the context.

The names of messages or information exchanged between multiple apparatuses in the embodiments of the present disclosure are illustrative only.

In the following embodiments, optional features and examples are provided in each embodiment at the same time, and various features described in the embodiments can be combined to form multiple alternative solutions, and each numbered embodiment should not be regarded as only one technical solution. In addition, the embodiments in the present disclosure and the features in the embodiments can be combined with each other in case of no conflict.

Figure 1:
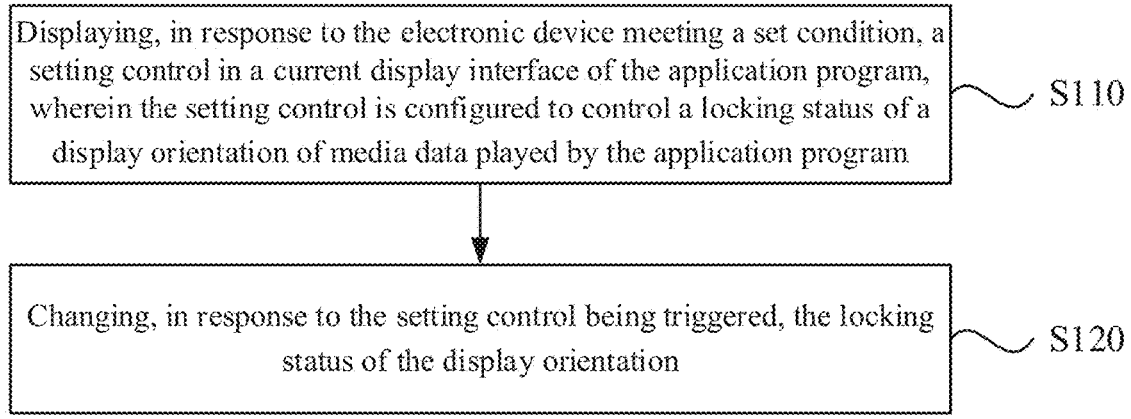
FIG. 1 is a flowchart of a locking method provided by an embodiment of the present disclosure.

FIG. 1 is a flowchart of a locking method provided by an embodiment of the present disclosure, and the method is applicable to the situation of locking the display orientation in an application program. The method can be executed by a locking apparatus, and the apparatus can be implemented by software and/or hardware and is generally integrated on an electronic device. In the present embodiment, the electronic device includes a computer, a laptop computer, a tablet computer, a mobile, etc.

Taking that media data is a short video as an example, in response to the user watching the short video, the orientation will continuously rotate in response to landscape adaptation, causing inconvenience to the user. In order to solve this problem, as shown in FIG. 1, a locking method provided by the embodiment of the present disclosure includes the following steps:

S110: displaying, in response to the electronic device meeting a set condition, a setting control in a current display interface of the application program, wherein the setting control is configured to control a locking status of a display orientation of media data played by the application program.

In the present embodiment, the set condition can be understood as a condition preset by the system or relevant personnel, which is used to judge displaying of the setting control. The content of the set condition can be that the electronic device performs a landscape/portrait-state switching; it can also be that the user performs a setting operation on the display screen of the electronic device; and it can also be that the electronic device receives an audio control instruction, and so on.

The setting control can refer to a control that sets the status of the current display interface of the application program, and is configured to control the locking status of the display orientation of media data played by the application program. For example, the setting control can be a control that triggers locking of the interface or a control that triggers unlocking of the interface, etc. The position of the setting control in the current display interface of the application program can be set as needed, and for example, it can be located in the left centered region. The current display interface can be considered as an interface within the application program currently displayed by the electronic device. The media data can be video data or image data, etc., in the application program. The display orientation can be considered as the orientation of the electronic device in response to displaying the media data, such as landscape state or portrait state, etc. The locking status can include a locked state and a not locked state (i.e., an unlocked state). in response to the locking status being the locked state, the display orientation is locked, and in response to the locking status being the unlocked state, the display orientation is unlocked.

The attribute control can be a control that represents the attribute of the media data, and the number and content of the attribute controls can be set as needed. For example, the attribute control can include a control for liking media data, a control for commenting on media data, and/or a control for forwarding media data, etc. The user can operate the attribute control to realize the processing of the attribute of the media data. In the present disclosure, regardless of whether the locking status of the display orientation is locked or unlocked, the attribute control is displayed in the current display interface for the user to operate.

In an embodiment, in response to the electronic device meeting the set condition, the setting control can be display in the current display interface of the application program, so as to control the locking status of the display orientation of the media data played by the application program; at the same time, the current display interface includes one or more attribute controls of the media data.

Optionally, the electronic device meeting the set condition includes one of the following:
the electronic device performs a landscape/portrait-state switching;
a setting operation is received on the display screen of the electronic device.

In the present embodiment, the landscape/portrait-state switching can be understood as that the screen of the electronic device switches from a landscape state to a portrait state, or that the screen of the electronic device switches from a portrait state to a landscape state, or that the screen of the electronic device switches from a landscape or portrait state to an inverted state. In the present step, the means for detecting the landscape/portrait-state switching can be detecting the variation of the screen angle of the electronic device. In response to that it is detected that the variation of the screen angle of the electronic device exceeds a set angle, such as 45 degrees, it is considered that the electronic device has performed the landscape/portrait-state switching.

The coverage scene, in which the electronic device performs a landscape/portrait-state switching to trigger displaying of a setting control, includes a scene supporting landscape-state playing of media data.

In an embodiment, the precondition that the electronic device performs a landscape/portrait-state switching to trigger displaying of a setting control can be that the automatic rotation function of the electronic device is turned on. If the automatic rotation function is turned off, in response to the electronic device performing a landscape/portrait-state switching, the setting control may not be displayed, or the setting control may be displayed. In response to the setting control being displayed, the electronic device may not respond to triggering of the setting control.

After displaying of the setting control is triggered by the landscape/portrait-state switching, if the setting control is a lock control, lock the current screen state is locked in response to clicking the lock control, and the setting control will changed to a locked style. In response to displaying a certain duration, the setting control will disappear automatically, and if a landscape/portrait-state switching occurs, the setting control will disappear directly. If the setting control is an unlock control, the current screen state is unlocked in response to clicking the unlock control, and the setting control will be changed to an unlocked style. In response to displaying a certain duration, the setting control will disappear automatically, and if a landscape/portrait-state switching occurs, the setting control will disappear directly.

The setting operation can refer to an operation that triggers displaying of the setting control. The content of the setting operation can be preset by the system or relevant personnel, and for example, it can include an operation of the user clicking on the display screen of the electronic device.

S120: changing, in response to the setting control being triggered, the locking status of the display orientation.

The media data and the attribute control of the media data are displayed in the current display interface, the setting control includes a lock control and an unlock control, the lock control is configured to lock the display orientation, and the unlock control is configured to unlock the display orientation. In the case where the setting control is a lock control, the display orientation is locked in response to the lock control being triggered. In the case where the setting control is an unlock control, the display orientation is unlocked in response to the unlock control being triggered.

In an embodiment, in response to the setting control being displayed in the current display interface of the application program, the user can select whether or not to trigger the setting control. In response to the user selecting to trigger the setting control, it means that the user wants to control the locking status of the display orientation of the media data played by the application program, and at this time, the locking status of the display orientation can be changed, and at the same time, the current display interface displays the media data and the attribute control; if the user does not trigger the setting control, it means that the user does not need to control the locking status of the display orientation of the media data played by the application program, and at this time, the locking status of the current display orientation can be maintained.

Illustratively, the lock control and the unlock control may be simultaneously displayed in the current processing interface, or only the lock control may be displayed in the current processing interface, or only the unlock control may be displayed in the current processing interface. In response to a setting control, such as a lock control, being displayed in the current display interface of the application program, the user selects to trigger the setting control, and at this time, the display orientation can be locked, that is, the display orientation of the media data played by the application program has been locked, thereby enhancing the user experience; in response to a setting control, such as an unlock control, being displayed in the current display interface of the application program, the user selects to trigger the setting control, and at this time, the display orientation can be set to an unlocked state, that is, the display orientation of the media data played by the application program can varied with the change of the orientation of the electronic device.

Figure 2:
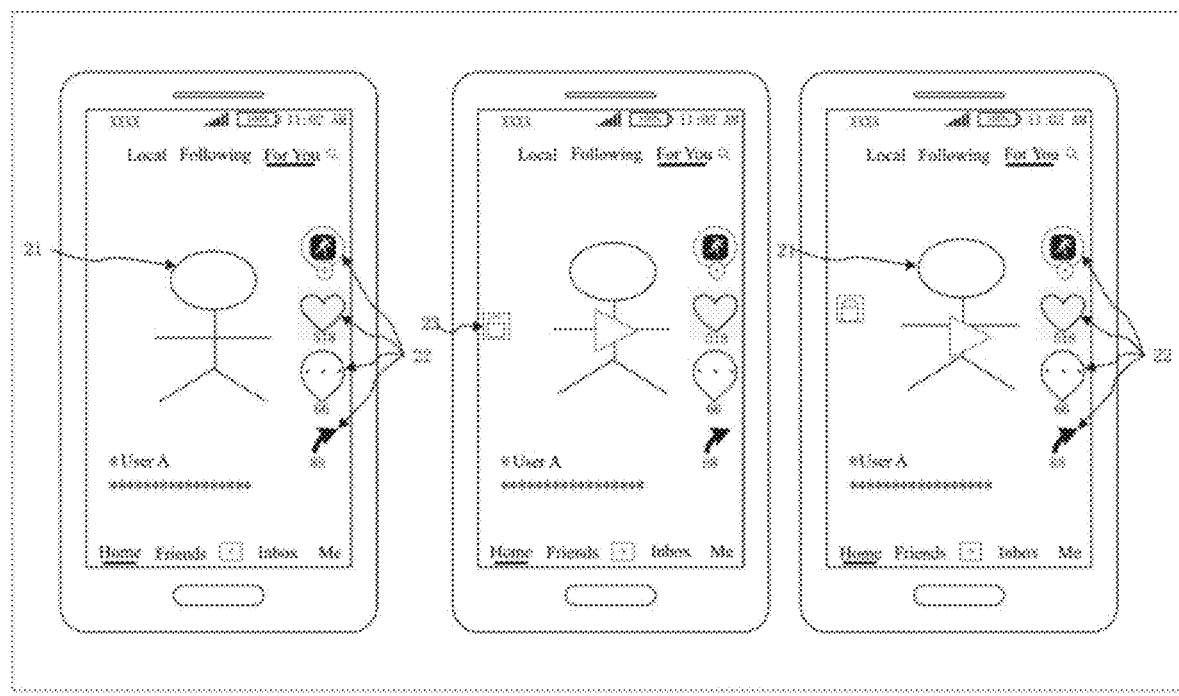
FIG. 2 is a schematic diagram of a variation of a locking method provided by the embodiment of the present disclosure.

FIG. 2 is a schematic diagram of a variation of the current display interface of an application program provided by the embodiment of the present disclosure. FIG. 2 is a schematic diagram for describing from in response to that the electronic device does not meet the set condition, to in response to the electronic device meeting the set condition, and then to in response to the setting control being triggered. In FIG. 2, only some frames are taken as an example for illustration, and the sequence of these frames is from left to right. As shown in FIG. 2, in response to that the electronic device does not meet the set condition (for example, the user is watching a video), the current display interface of the application program includes media data 21 and attribute controls 22 of the media data; in response to the electronic device meeting the set condition (e.g., clicking on the screen), a setting control 23 (e.g., a lock control) is displayed in the current display interface of the application program, and the setting control 23 is configured to control the locking status of the display orientation of the media data played by the application program; in response to the setting control 23 being triggered, the locking status of the display orientation can be changed, and at the same time, the current display interface displays the media data 21 and the attribute controls 22.

Illustratively, in the case where the setting control 23 is a lock control, the current screen status (landscape & portrait) can be locked in response to clicking the screen lock button (i.e., the setting control 23), and the status of the setting control 23 will changed to a locked style; in the case where the setting control 23 is an unlock control, the current screen status (landscape & portrait) can be unlocked in response to clicking the screen lock button (i.e., setting the control 23), and the status of the setting control 23 will changed to an unlocked style. Finally, the user can click on the screen and the current display interface returns to the playback state, and the screen lock disappears.

The embodiment of the present disclosure provides a locking method, which is applied to an application program on an electronic device and includes: displaying, in response to the electronic device meeting a set condition, a setting control in a current display interface of the application program, wherein the setting control is configured to control a locking status of a display orientation of media data played by the application program; changing, in response to the setting control being triggered, the locking status of the display orientation, wherein the current display interface includes the media data and an attribute control of the media data, the setting control includes a lock control and an unlock control, the lock control is configured to lock the display orientation, and the unlock control is configured to unlock the display orientation. By using the method, in response to the electronic device meeting the set condition, the setting control can be displayed in the current display interface of the application program, so as to realize changing the locking status of the display orientation, thus improving the convenience for the user to change the locking status. At the same time, the current display interface can display the media data and the attribute control, so that the user can operate the media data and the attribute control in the current display interface while changing the locking status of the display orientation, thus improving the user experience.

On the basis of the above embodiment, modified embodiments of the above embodiment are proposed. It is to be noted herein that in order to make the description brief, only the differences from the above embodiment are described in the modified embodiments.

In an embodiment, in response to the electronic device meeting the set condition, the method further includes:

displaying indication information for a first set duration, wherein the indication information indicates information related to the setting control.

The first set duration can refer to the display duration of the indication information, which can be preset by the system or relevant personnel, for example, can be 3s or the like. The indication information can be information indicating the setting control, for example, can be information indicating triggering the setting control, such as "click to lock". The indication information can also be feedback information of triggering the setting control, such as "locked" or the like. In addition, the timing of displaying the indication information in the present embodiment can be set as needed, for example, it can be displayed in response to the setting control being displayed in the current display interface of the application program, or it can be displayed in response to the setting control being triggered; the number of times the indication information is displayed can be every time or a set number of times.

Optionally, the display times of the indication information are set number of times.

The set number of times can refer to the upper limit of the display times of displaying the indication information, and the set number of times can be preset by the system or relevant personnel, for example, can be 10 times. In the present embodiment, the times of occurrences of different information indicating the setting control and the feedback information of triggering the setting control can be calculated separately, and then accumulated to obtain the display times. Taking the setting number of times as 10 times as an example, in response to the display times exceeding 10 times, the indication information is no longer displayed Illustratively, the accumulative display times of the indication information in the whole life cycle of the use of the application program do not exceed the set number of times, and for example, the indication information, such as "click to lock," "locked," "click to unlock," "unlocked," etc., are calculated separately.

The times of occurrences of each indication information appears can be set arbitrarily. For example, "click to lock" and "click to unlock" may only appear once, or "locked" and "unlocked" may only appear once.

For example, in response to the user completing the lock operation through the setting control for the first time, it is prompted that the "click to lock" or "click to unlock" copy will no longer be displayed thereafter; or it is prompted that the "locked" or "unlocked" copies will no longer be displayed thereafter.

In an embodiment, in response to the electronic device meeting the set condition, the indication information can be displayed for a first set duration, so as to display the information indicating the setting control or to display the feedback information of triggering the setting control, etc.

In an embodiment, in response to that the display orientation is locked and a duration of switching the display orientation of the media data back to a display orientation before switching is less than a second set duration, it is determined that a display status of the indication information is not to display the indication information; and in response to that the display orientation is unlocked and the duration of switching the display orientation of the media data back to the display orientation before switching is less than the second set duration, it is determined that the display status of the indication information is to display the indication information.

The second set duration can refer to a critical duration for switching the display orientation, which can be preset by the system or relevant personnel, for example, can be 3s or the like.

In an embodiment, in the case where the duration of switching the display orientation of the media data back to the display orientation before switching is less than the second set duration, the display status of the indication information can be determined based on the locking status of the display orientation. Illustratively, in the case where the display orientation is locked, if the display orientation of the media data is switched back within the second set duration, for example, the display orientation of the media data is switched from a landscape state to a portrait state and is switched back to the landscape state within 3s, the display status of the indication information can be not to display the indication information; in the case where the display orientation is not locked, that is, unlocked, if the display orientation of the media data is switched back within the second set duration, the display status of the indication information can be to display the indication information, such as "click to lock", or the feedback information of triggering the setting control, that is, "locked".

In an embodiment, the changing, in response to the setting control being triggered, the locking status of the display orientation includes:
  changing the locking status of the display orientation through a control rotation service in response to a lock controller detecting that the setting control is triggered.

The lock controller can be understood as a service that detects the triggering of the setting control, and it can detect whether the setting control is triggered by receiving the notification of the interaction between the user and the information stream. The control rotation service can be a service for controlling the locking status of the display orientation.

In an embodiment, in response to the lock controller detecting that the setting control is triggered, the locking status of the display orientation can be changed through the control rotation service. For example, in response to the user clicking to lock (that is, triggers the setting control, where the setting control is a lock control), the rotation of the screen (that is, the display orientation) can be locked through the control rotation service. In response to the user clicking to unlock (that is, triggers the setting control, where the setting control is an unlock control), the rotation of the screen (that is, the display orientation) can be unlocked through the control rotation service.

Figure 3:
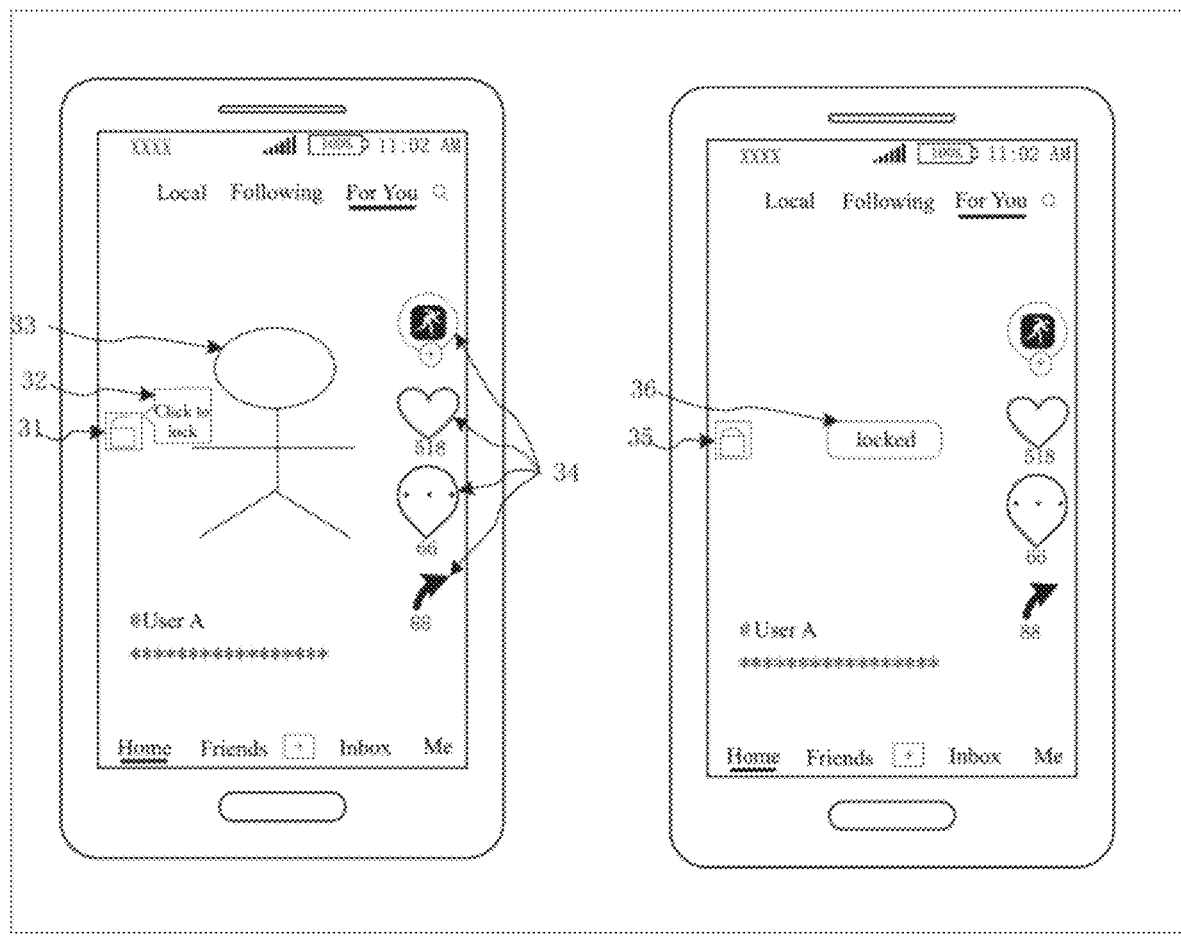
FIG. 3 is a schematic diagram of a variation of the current display interface of an application program provided by the embodiment of the present disclosure.

FIG. 3 is a schematic diagram of a variation of the current display interface of an application program provided by the embodiment of the present disclosure. FIG. 3 is a schematic diagram of an example from displaying a setting control in the current display interface of the application program to the setting control being triggered. In FIG. 3, only some frames are taken as an example for illustration, and the sequence of these frames is from left to right.

As shown in FIG. 3, in response to the electronic device meeting the set condition, a setting control 31 and indication information 32 can be displayed in the current display interface of the application program. The setting control 31 is a control for triggering locking, and the indication information 32 represents the information indicating triggering the setting control 31, that is, "click to lock". The display interface further includes media data 33 and attribute controls 34 of the media data 33. In response to the setting control 31 being triggered, the setting control 35 and the indication information 36 are displayed in the current display interface of the application program, the setting control 35 is in a locked style, and the indication information 36 represents feedback information of triggering the setting control 31, that is, represents "locked".

In an embodiment, the current display interface in the locked state can display the media data 33 and the attribute controls 34 for the user to operate the media data 33 and the attribute controls 34. It is to be noted that the setting control 35 and the indication information 36 can be displayed for 3s and then disappear in the current display interface, so as to facilitate the user to operate the media data 33 and the attribute controls 34.

Figure 4:
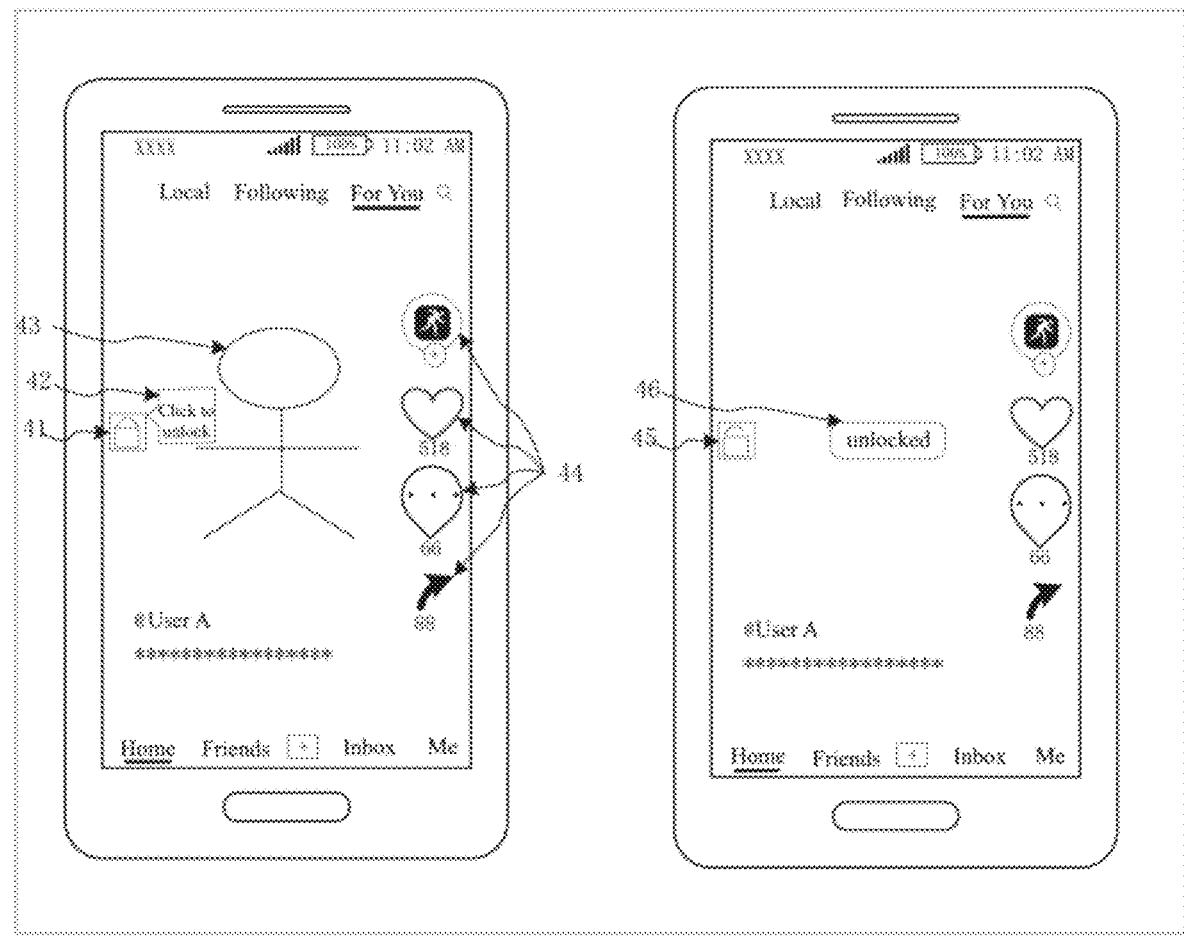
FIG. 4 is a schematic diagram of another variation of the current display interface of an application program provided by the embodiment of the present disclosure.

FIG. 4 is a schematic diagram of another variation of the current display interface of an application program provided by the embodiment of the present disclosure. FIG. 4 is a schematic diagram of an example from displaying a setting control in the current display interface of the application program to the setting control being triggered. In FIG. 4, only some frames are taken as an example for illustration, and the sequence of these frames is from left to right.

As shown in FIG. 4, in response to the electronic device meeting the setting conditions, a setting control 41 and indication information 42 can be displayed in the current display interface of the application program. The setting control 41 is a control for triggering unlocking, and the indication information 42 represents the information indicating triggering the setting control 41, that is, "click to unlock". The display interface further includes media data 43 and attribute controls 44 of the media data 43. in response to the setting control 41 being triggered, the setting control 45 and the indication information 46 are displayed in the current display interface of the application program, the setting control 45 is in a unlocked style, and the indication information 46 represents feedback information of triggering the setting control 41, that is, represents "unlocked"; at the same time, the current display interface displays the media data 43 and the attribute controls 44 for the user to operate the media data 43 and the attribute controls 44. It is to be noted that the setting control 45 and the indication information 46 can be displayed for 3s and then disappear in the current display interface, so as to facilitate the user to operate the media data 43 and the attribute controls 44.

Figure 5:
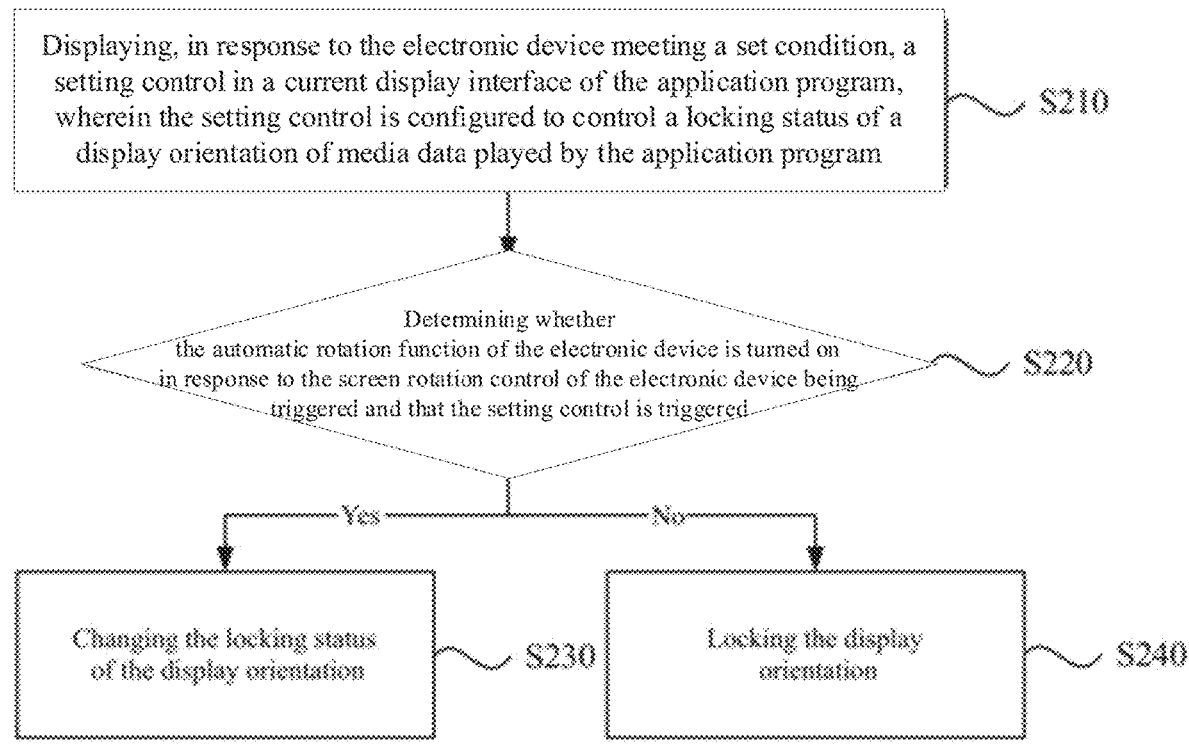
FIG. 5 is a flowchart of a locking method provided by another embodiment of the present disclosure.

FIG. 5 is a flowchart of a locking method provided by another embodiment of the present disclosure. In another embodiment, modifications are made based on various optional solutions in the above embodiment in FIGS. 1-4. In the present embodiment, the changing, in response to the setting control being triggered, the locking status of the display orientation is modified to: changing the locking status of the display orientation in response to that the setting control is triggered and an automatic rotation function of the electronic device is turned on in response to a screen rotation control of the electronic device being triggered.

For details, not yet provided, of the present embodiment, reference can be made to the above embodiment in FIGS. 1-4.

As shown in FIG. 5, a locking method provided by another embodiment of the present disclosure includes the following steps:

S210: displaying, in response to the electronic device meeting a set condition, a setting control in a current display interface of the application program, wherein the setting control is configured to control a locking status of a display orientation of media data played by the application program.

S220: determining whether the automatic rotation function of the electronic device is turned on in response to the screen rotation control of the electronic device being triggered and that the setting control is triggered; performing S230 in response to that the automatic rotation function of the electronic device is turned on in response to the screen rotation control of the electronic device being triggered and the setting control is triggered; performing S240 in response to that the automatic rotation function of the electronic device is not turned on in response to the screen rotation control of the electronic device being triggered or the setting control is not triggered.

In the present embodiment, the screen rotation control can be considered as a control for controlling the on-off status of the automatic rotation function of the screen of the electronic device. For example, in response to the screen rotation control being triggered, the automatic rotation function of the electronic device can be turned on or turned off, and whether it is turned on or off is determined by the current on-off status of the automatic rotation function of the screen of the electronic device. The screen rotation control can be a built-in system lock of the electronic device. The screen rotation control can be considered as an automatic rotation control, through which the landscape/portrait-state automatic rotation mode of the electronic device can be turned on or off.

In order to control the locking status of the display orientation of the media data played by the application program, it is needed to determine whether the automatic rotation function of the electronic device is turned on in response to the screen rotation control of the electronic device being triggered, and whether the setting control is triggered.

In response to that the automatic rotation function of the electronic device is turned on in response to the screen rotation control of the electronic device being triggered and that the setting control is triggered, the locking status of the display orientation can be changed.

In the case where the automatic rotation function of the electronic device is turned off in response to the screen rotation control of the electronic device being triggered, the display orientation is locked in response to that the automatic rotation function is turned off without responding to that the setting control is triggered.

S230: changing the locking status of the display orientation, and ending the operation.

S240: locking the display orientation.

In the locking method provided by another embodiment of the present disclosure, the locking status of the display orientation can be controlled by determining whether the automatic rotation function of the electronic device is turned on in response to the screen rotation control of the electronic device being triggered and whether the setting control is triggered, thereby improving the accuracy of the locking method.

Figure 6:
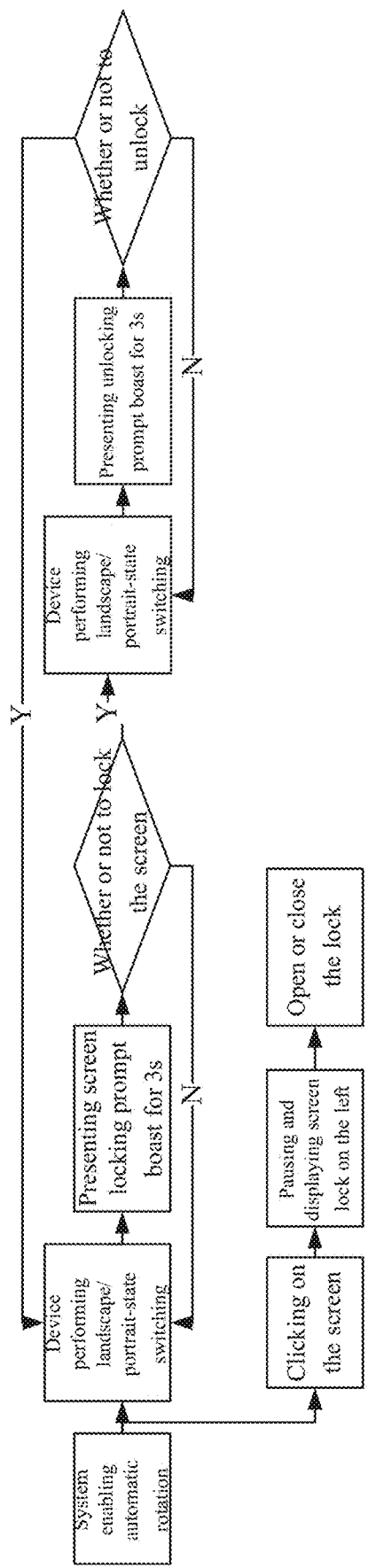
FIG. 6 is a flowchart of another locking method provided by the another embodiment of the present disclosure.

FIG. 6 is a flowchart of another locking method provided by another embodiment of the present disclosure. As shown in FIG. 6, in response to the system enables automatic rotation, the electronic device can meet the set condition in two ways. On the one hand, in response to the user clicking on the screen, that is, in response to a setting operation being received on the display screen of the electronic device, a pause can be displayed in the current display interface of the application program, and a screen lock (that is, a setting control) can be displayed on the left side of the display interface; the user can select to open or close the screen lock (that is, the setting control is triggered); and finally, in the current display interface, the locking status of the display orientation is changed, and media data and attribute controls can be displayed. On the other hand, in response to the electronic device performing a landscape/portrait-state switching, the electronic device meets the set condition, and a screen locking prompt boast (i.e. setting control) can be displayed in the current display interface of the application program for 3s; the user can select whether or not to lock the screen; in response to the user selecting Yes, the locking status of the display orientation is set to be locked, and then, in response to the electronic device performing a landscape/portrait-state switching again, the electronic device meets the set condition, and an unlocking prompt boast (i.e. setting control) can be displayed in the current display interface of the application program for 3s; the user can select whether or not to unlock, and a subsequent operation can be performed according to the selection. In response to that the user does not select to lock the screen, the locking status of the display orientation is not changed, and the above operations are cyclically performed in response to the electronic device performing a landscape/portrait-state switching again.

Figure 7:
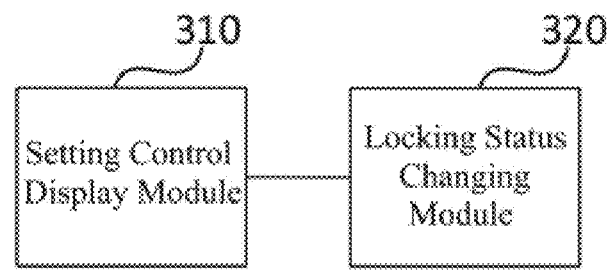
FIG. 7 is a schematic structural diagram of a locking apparatus provided by another embodiment of the present disclosure.

FIG. 7 is a schematic structural diagram of a locking apparatus provided by another embodiment of the present disclosure, and the apparatus is applicable to the situation of locking the display orientation in an application program. The apparatus can be implemented by software and/or hardware and is generally integrated on an electronic device.

As shown in FIG. 7, the apparatus includes:
a setting control display module 310, configured to display, in response to the electronic device meeting a set condition, a setting control in a current display interface of an application program on the electronic device, wherein the setting control is configured to control a locking status of a display orientation of media data played by the application program; and
a locking status changing module 320, configured to change, in response to the setting control being triggered, the locking status of the display orientation, wherein the current display interface includes the media data and an attribute control of the media data, the setting control includes a lock control and an unlock control, the lock control is configured to lock the display orientation, and the unlock control is configured to unlock the display orientation.

In the present embodiment, the apparatus displays, via the setting control display module 310, a setting control in a current display interface of an application program on the electronic device in response to the electronic device meeting a set condition, and the setting control is configured to control a locking status of a display orientation of media data played by the application program; and the apparatus changes, via the locking status changing module 320, the locking status of the display orientation in response to the setting control being triggered, the current display interface includes the media data and an attribute control of the media data, the setting control includes a lock control and an unlock control, the lock control is configured to lock the display orientation, and the unlock control is configured to unlock the display orientation. By using the apparatus, in response to the electronic device meeting the set condition, the setting control can be displayed in the current display interface of the application program, so as to realize changing the locking status of the display orientation, and at the same time, the current display interface can display the media data and the attribute control, so that the user can operate the media data and the attribute control in the current display interface while changing the locking status of the display orientation, thus improving the user experience.

In an embodiment, the electronic device meeting the set condition includes one of the following:
the electronic device performs a landscape/portrait-state switching;
a setting operation is received on a display screen of the electronic device.

In an embodiment, the apparatus further includes an indication information display module, which is configured, in response to the electronic device meeting the set condition, to:
display indication information for a first set duration, wherein the indication information indicates information related to the setting control.

In an embodiment, display times of the indication information are a set number of times.

In an embodiment, in response to that the display orientation is locked and a duration of switching the display orientation of the media data back to a display orientation before switching is less than a second set duration, it is determined that a display status of the indication information is not to display the indication information; and
in response to that the display orientation is unlocked and the duration of switching the display orientation of the media data back to the display orientation before switching is less than the second set duration, it is determined that the display status of the indication information is to display the indication information.

In an embodiment, the locking status changing module 320 is configured to:
change the locking status of the display orientation in response to that the setting control is triggered and an automatic rotation function of the electronic device is turned on in response to a screen rotation control of the electronic device being triggered.

In an embodiment, the locking status changing module 320 is configured to:
change the locking status of the display orientation through a control rotation service in response to a lock controller detecting that the setting control is triggered.

The locking apparatus can execute the locking method provided by any embodiment of the present disclosure, and has corresponding functional modules for executing the locking method and corresponding beneficial effects of the locking method.

Figure 8:
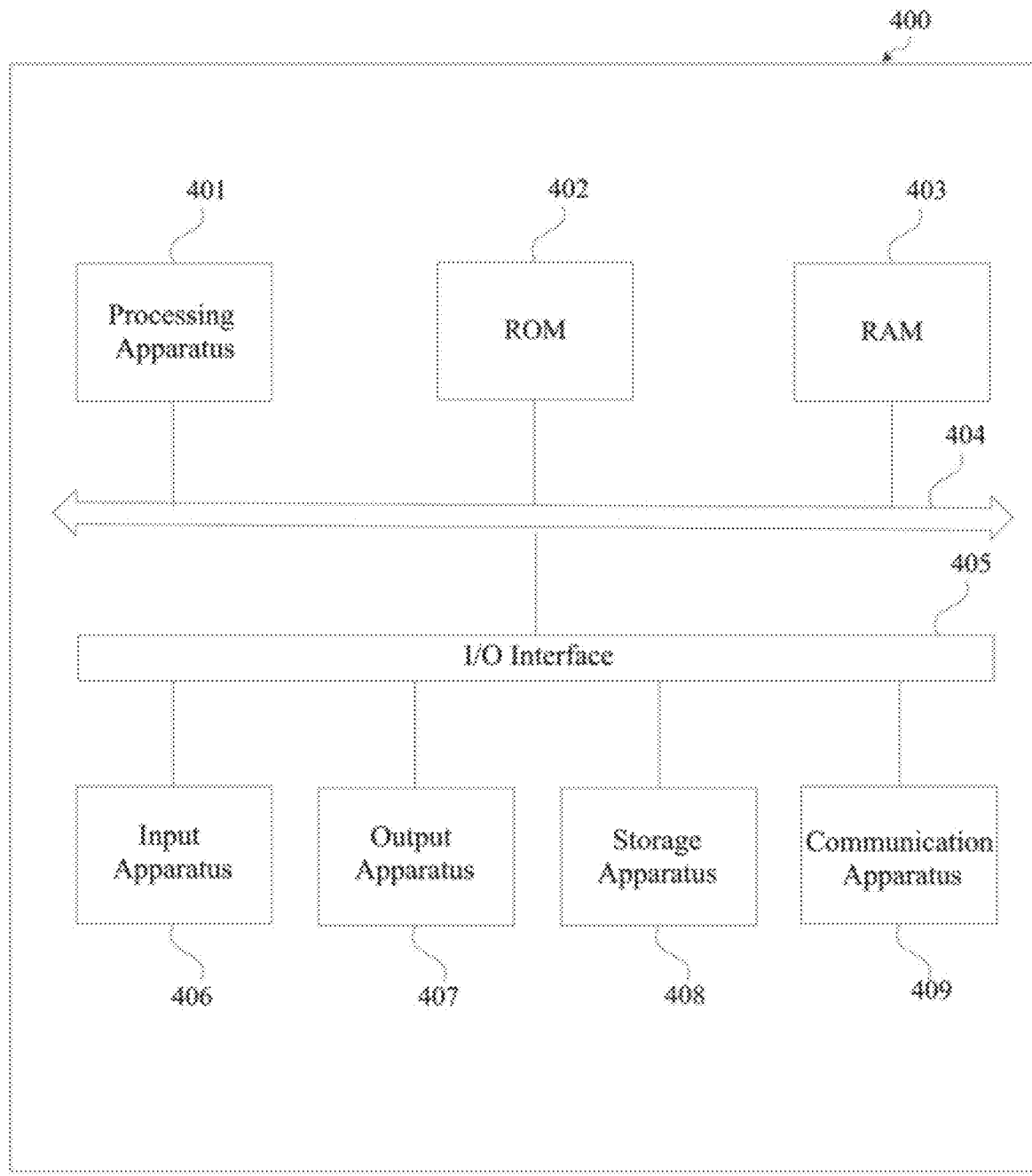
FIG. 8 is a schematic structural diagram of an electronic device provided by another embodiment of the present disclosure.

FIG. 8 is a schematic structural diagram of an electronic device provided by another embodiment of the present disclosure. FIG. 8 shows a schematic structural diagram of an electronic device 400 suitable for implementing the embodiments of the present disclosure. The electronic device in the embodiment of the present disclosure can include, but is not limited to, a mobile terminal such as a mobile phone, a laptop computer, a digital broadcast receiver, a personal digital assistant (PDA), a portable android device (PAD), a portable media player (PMP), a vehicle-mounted terminal (e.g., vehicle-mounted navigation terminal), etc., and a fixed terminal such as a digital television (TV), a desktop computer, etc. The electronic device shown in FIG. 8 is merely an example.

As shown in FIG. 8, the electronic device 400 can include one or more processing apparatuses (e.g., central processing unit, graphics processing unit, etc.) 401, and the electronic device 400 can execute various appropriate actions and processes according to a program stored on a read-only memory (ROM) 402 or a program loaded from a storage apparatus 408 into a random access memory (RAM) 403. In the RAM 403, various programs and data necessary for the operations of the electronic device 400 are also stored. The processing apparatus 401, the ROM 402, and the RAM 403 are connected to each other through a bus 404. An input/output (I/O) interface 405 is also connected to the bus 904.

Generally, the following apparatuses can be connected to the I/O interface 405: an input apparatus 406 including, for example, a touch screen, a touch pad, a keyboard, a mouse, a camera, a microphone, an accelerometer, a gyroscope, etc.; an output apparatus 407 including, for example, a liquid crystal display (LCD), a speaker, a vibrator, etc.; a storage apparatus 408 including, for example, a magnetic tape, a hard disk, etc., the storage apparatus 408 being configured to store a program; and a communication apparatus 409. The communication apparatus 409 can allow the electronic device 400 to perform wireless or wired communication with another device to exchange data. Although FIG. 8 illustrates the electronic device 400 with various apparatuses, it is to be understood that all illustrated apparatuses are not required to be implemented or provided. More or fewer apparatuses can be alternatively implemented or provided.

In particular, according to the embodiment of the present disclosure, the process described above with reference to the flowcharts can be implemented as a computer software program. For example, an embodiment of the present disclosure includes a computer program product, the computer program product includes a computer program carried on a non-transitory computer-readable medium, and the computer program contains program codes for performing the method illustrated by the flowcharts. In such an embodiment, the computer program can be downloaded and installed from a network via the communication apparatus 409, or installed from the storage apparatus 408, or installed from the ROM 402. In response to the computer program being executed by the processing apparatus 401, the above functions defined in the method according to the embodiment of the present disclosure are performed.

It is to be noted that the above computer-readable medium in the present disclosure can be a computer-readable signal medium or a computer-readable storage medium or any combination thereof. The computer-readable storage medium can be, for example, but not limited to, an electronic, magnetic, optical, electromagnetic, infrared, or semiconductor system, apparatus, or device, or any combination of the above. The computer-readable storage medium can include: an electrical connection having one or more wires, a portable computer diskette, a hard disk, a random access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the above. In the present disclosure, the computer-readable storage medium can be any tangible medium containing or storing a program, wherein the program can be used by or in conjunction with an instruction execution system, apparatus, or device. In the present disclosure, the computer-readable signal medium can include a data signal propagated on a baseband or as part of a carrier wave, in which computer-readable program code is carried. Such a propagated data signal can be in a variety of forms, including but not limited to an electro-magnetic signal, an optical signal, or any suitable combination of the above. The computer-readable signal medium can also be any computer-readable medium other than the computer-readable storage medium, and the computer-readable signal medium can send, propagate, or transmit a program for use by or in conjunction with an instruction execution system, apparatus, or device. Program codes contained on the computer-readable medium can be transmitted using any suitable medium, including but not limited to: an electrical wire, an optical cable, radio frequency (RF), etc., or any suitable combination of the above.

In some implementations, a client and a server can communicate using any network protocol currently known or to be developed in the future, such as HTTP (HyperText Transfer Protocol), etc., and can be interconnected with any form or medium of digital data communication (e.g., a communication network). Examples of the communication network include a local area network (LAN), a wide area network (WAN), an internet (e.g., the Internet), and a peer-to-peer network (e.g., ad hoc peer-to-peer network), as well as any network currently known or to be developed in the future.

The above computer-readable medium can be contained in the above electronic device 400; or can exist alone without being assembled into the electronic device 400.

The above computer-readable medium has thereon carried one or more programs which, upon being executed by the electronic device, implements the following method: the computer-readable medium carries one or more programs, which, upon being executed by the electronic device, causes the electronic device 400 to: display, in response to the electronic device meeting a set condition, a setting control in a current display interface of the application program, wherein the setting control is configured to control a locking status of a display orientation of media data played by the application program; and change, in response to the setting control being triggered, the locking status of the display orientation, wherein the current display interface comprises the media data and an attribute control of the media data, the setting control comprises a lock control and an unlock control, the lock control is configured to lock the display orientation, and the unlock control is configured to unlock the display orientation.

Computer program codes for performing operations of the present disclosure can be written in one or more programming languages or a combination thereof, wherein the programming language includes, but is not limited to, an object-oriented programming language such as Java, Smalltalk, C++, and also includes a conventional procedural programming language such as a "C" language or similar programming language. The program codes can be executed entirely on a user computer, partly on the user computer, as a stand-alone software package, partly on the user computer and partly on a remote computer, or entirely on the remote computer or a server. In a scene where the remote computer is involved, the remote computer can be connected to the user computer through any type of network, including a local area network (LAN) or a wide area network (WAN), or can be connected to an external computer (for example, through the Internet using an Internet service provider).

The flowcharts and block diagrams in the accompanying drawings illustrate the possibly implemented architecture, functions, and operations of the system, method and computer program product according to various embodiments of the present disclosure. In this regard, each block in the flowcharts or block diagrams can represent one module, program segment, or portion of code, which contains one or more executable instructions for implementing the specified logic function. It is also to be noted that, in some alternative implementations, functions noted in blocks can occur in an order different from an order noted in the drawings. For example, two blocks shown in succession can, in fact, be executed substantially concurrently, and they can sometimes be executed in a reverse order, which depends upon functions involved. It is also to be noted that each block in the block diagrams and/or flowcharts, and a combination of blocks in the block diagrams and/or flowcharts, can be implemented by a dedicated hardware-based system that performs a specified function or operation, or can be implemented by a combination of dedicated hardware and computer instructions.

The involved module described in the embodiment of the present disclosure can be implemented by software or hardware.

The above functions described herein can be performed, at least in part, by one or more hardware logic components. For example, an exemplary type of hardware logic component that can be used includes: a field programmable gate array (FPGA), an application specific integrated circuit (ASIC), an application specific standard product (ASSP), a system on a chip (SOC), a complex programmable logic device (CPLD), and so on.

In the context of the present disclosure, a machine-readable medium can be a tangible medium, which can contain or store a program that is used by or in conjunction with an instruction execution system, apparatus, or device. The machine-readable medium can be a machine-readable signal medium or a machine-readable storage medium. The machine-readable medium can include an electronic, magnetic, optical, electromagnetic, infrared, or semiconductor system, apparatus, or device, or any suitable combination of the above. The machine-readable storage medium can include an electrical connection based on one or more wires, a portable computer diskette, a hard disk, a RAM, a ROM, an erasable programmable read-only memory (EPROM or flash memory), an optical fiber, a CD-ROM, an optical storage device, a magnetic storage device, or any suitable combination of the above.

According to one or more embodiments of the present disclosure, Example 1 provides a locking method, which is applied to an application program on an electronic device and includes:
  displaying, in response to the electronic device meeting a set condition, a setting control in a current display interface of the application program, wherein the setting control is configured to control a locking status of a display orientation of media data played by the application program;
  changing, in response to the setting control being triggered, the locking status of the display orientation, wherein the current display interface comprises the media data and an attribute control of the media data, the setting control comprises a lock control and an unlock control, the lock control is configured to lock the display orientation, and the unlock control is configured to unlock the display orientation.

According to one or more embodiments of the present disclosure, in Example 2 based on the method of example 1, the electronic device meeting the set condition comprises one of the following:
  the electronic device performs a landscape/portrait-state switching;
  a setting operation is received on a display screen of the electronic device.

According to one or more embodiments of the present disclosure, in Example 3 based on the method of example 1, in response to the electronic device meeting the set condition, the method further comprises:
  displaying indication information for a first set duration, wherein the indication information indicates information related to the setting control.

According to one or more embodiments of the present disclosure, in Example 4 based on the method of example 1, display times of the indication information are a set number of times.

According to one or more embodiments of the present disclosure, in Example 5 based on the method of example 1, the method further includes:
  determining, in response to that the display orientation is locked and a duration of switching the display orientation of the media data back to a display orientation before switching is less than a second set duration, that a display status of the indication information is not to display the indication information;
  determining, in response to that the display orientation is unlocked and the duration of switching the display orientation of the media data back to the display orientation before switching is less than the second set duration, that the display status of the indication information is to display the indication information.

According to one or more embodiments of the present disclosure, in Example 6 based on the method of example 1, the changing, in response to the setting control being triggered, the locking status of the display orientation comprises:
  changing the locking status of the display orientation in response to that the setting control is triggered and an automatic rotation function of the electronic device is turned on in response to a screen rotation control of the electronic device being triggered.

According to one or more embodiments of the present disclosure, in Example 7 based on the method of example 1, the changing, in response to the setting control being triggered, the locking status of the display orientation comprises:
  changing the locking status of the display orientation through a control rotation service in response to a lock controller detecting that the setting control is triggered.

According to one or more embodiments of the present disclosure, Example 8 provides a locking apparatus configured in an electronic device, and the apparatus includes:
  a setting control display module, configured to display, in response to the electronic device meeting a set condition, a setting control in a current display interface of an application program on the electronic device, wherein the setting control is configured to control a locking status of a display orientation of media data played by the application program;
  a locking status changing module, configured to change, in response to the setting control being triggered, the locking status of the display orientation, wherein the current display interface comprises the media data and an attribute control of the media data, the setting control comprises a lock control and an unlock control, the lock control is configured to lock the display orientation, and the unlock control is configured to unlock the display orientation.

According to one or more embodiments of the present disclosure, Example 9 provides an electronic device, which includes:
  one or more processing apparatuses;
  a storage apparatus, configured to store one or more programs;
  wherein the one or more programs, upon being executed by the one or more processing apparatuses, cause the one or more processing apparatuses to realize the method according to any one of Examples 1-7.

According to one or more embodiments of the present disclosure, Example 10 provides a computer-readable medium, the computer-readable medium has thereon stored a computer program, and the computer program, upon being executed by a processing apparatus, realizes the method according to any one of Examples 1-7.

The invention claimed is:

1. A locking method, applied to an application program on an electronic device, wherein the method comprises:
   displaying, in response to the electronic device meeting a set condition, a setting control in a current display interface of the application program, wherein the setting control is configured to control a locking status of a display orientation of media data played by the application program;
   changing, in response to the setting control being triggered, the locking status of the display orientation, wherein the current display interface comprises the media data and an attribute control of the media data, the setting control comprises a lock control and an unlock control, the lock control is configured to lock the display orientation, and the unlock control is configured to unlock the display orientation; and
   displaying, in response to the electronic device meeting the set condition, indication information for a first set duration, wherein the indication information indicates information related to the setting control, and the indication information and the setting control are both displayed in the current display interface of the application program,
   wherein the method further comprises:
   determining, in response to the display orientation being locked and a duration between a moment when switching the display orientation of the media data from a first orientation to a second orientation and a moment when switching the display orientation of the media data from the second orientation back to the first orientation being less than a second set duration, that the indication information is not displayed; and
   determining, in response to the display orientation being unlocked and the duration between the moment when switching the display orientation of the media data from the first orientation to the second orientation and the moment when switching the display orientation of the media data from the second orientation back to the first orientation being less than the second set duration, that the indication information is displayed.

2. The method according to claim 1, wherein the electronic device meeting the set condition comprises one of the following:
   the electronic device performing a landscape/portrait-state switching;
   a setting operation being received on a display screen of the electronic device.

3. The method according to claim 1, wherein display times of the indication information are a set number of times.

4. The method according to claim 1, wherein the changing, in response to the setting control being triggered, the locking status of the display orientation comprises:
   changing the locking status of the display orientation in response to that the setting control is triggered and an automatic rotation function of the electronic device is turned on in response to a screen rotation control of the electronic device being triggered.

5. The method according to claim 1, wherein the changing, in response to the setting control being triggered, the locking status of the display orientation comprises:
   changing the locking status of the display orientation through a control rotation service in response to a lock controller detecting that the setting control has been triggered.

6. An electronic device, comprising:
   a processing apparatus;
   a storage apparatus, configured to store a program;
   wherein the program upon being executed by the processing apparatus, causes the processing apparatus to implement a locking method, which is applied to an application program on the electronic device, wherein the method comprises:
   displaying, in response to the electronic device meeting a set condition, a setting control in a current display interface of the application program, wherein the setting control is configured to control a locking status of a display orientation of media data played by the application program;
   changing, in response to the setting control being triggered, the locking status of the display orientation, wherein the current display interface comprises the media data and an attribute control of the media data, the setting control comprises a lock control and an unlock control, the lock control is configured to lock the display orientation, and the unlock control is configured to unlock the display orientation; and
   displaying, in response to the electronic device meeting the set condition, indication information for a first set duration, wherein the indication information indicates information related to the setting control, and the indication information and the setting control are both displayed in the current display interface of the application program,
   wherein the method further comprises:
   determining, in response to the display orientation being locked and a duration between a moment when switching the display orientation of the media data from a first orientation to a second orientation and a moment when switching the display orientation of the media data from the second orientation back to the first orientation being less than a second set duration, that the indication information is not displayed; and
   determining, in response to the display orientation being unlocked and the duration between the moment when switching the display orientation of the media data from the first orientation to the second orientation and the moment when switching the display orientation of the media data from the second orientation back to the first orientation being less than the second set duration, that the indication information is displayed.

7. The electronic device according to claim 6, wherein the electronic device meeting the set condition comprises one of the following:
   the electronic device performing a landscape/portrait-state switching;
   a setting operation being received on a display screen of the electronic device.

8. The electronic device according to claim 6, wherein display times of the indication information are a set number of times.

9. The electronic device according to claim 6, wherein the changing, in response to the setting control being triggered, the locking status of the display orientation comprises:

changing the locking status of the display orientation in response to that the setting control is triggered and an automatic rotation function of the electronic device is turned on in response to a screen rotation control of the electronic device being triggered.

10. The electronic device according to claim 6, wherein the changing, in response to the setting control being triggered, the locking status of the display orientation comprises:
changing the locking status of the display orientation through a control rotation service in response to a lock controller detecting that the setting control has been triggered.

11. A non-transient computer-readable medium, storing a computer program thereon, wherein the computer program upon being executed by a processing apparatus, implements a locking method, which is applied to an application program on an electronic device, wherein the method comprises:
displaying, in response to the electronic device meeting a set condition, a setting control in a current display interface of the application program, wherein the setting control is configured to control a locking status of a display orientation of media data played by the application program;
changing, in response to the setting control being triggered, the locking status of the display orientation, wherein the current display interface comprises the media data and an attribute control of the media data, the setting control comprises a lock control and an unlock control, the lock control is configured to lock the display orientation, and the unlock control is configured to unlock the display orientation; and
displaying, in response to the electronic device meeting the set condition, indication information for a first set duration, wherein the indication information indicates information related to the setting control, and the indication information and the setting control are both displayed in the current display interface of the application program,
wherein the method further comprises:
determining, in response to the display orientation being locked and a duration between a moment when switching the display orientation of the media data from a first orientation to a second orientation and a moment when switching the display orientation of the media data from the second orientation back to the first orientation being less than a second set duration, that the indication information is not displayed; and
determining, in response to the display orientation being unlocked and the duration between the moment when switching the display orientation of the media data from the first orientation to the second orientation and the moment when switching the display orientation of the media data from the second orientation back to the first orientation being less than the second set duration, that the indication information is displayed.

12. The non-transient computer-readable medium according to claim 11, wherein the electronic device meeting the set condition comprises one of the following:
the electronic device performing a landscape/portrait-state switching;
a setting operation being received on a display screen of the electronic device.

13. The non-transient computer-readable medium according to claim 11, wherein display times of the indication information are a set number of times.

14. The non-transient computer-readable medium according to claim 11, wherein the method further comprises:
changing the locking status of the display orientation in response to that the setting control is triggered and an automatic rotation function of the electronic device is turned on in response to a screen rotation control of the electronic device being triggered.

* * * * *